United States Patent
Zumdome et al.

(10) Patent No.: US 9,313,943 B2
(45) Date of Patent: Apr. 19, 2016

(54) SEED-DOUBLE ELIMINATOR FOR A PLANTING UNIT

(71) Applicant: Deere & Company, Moline, IL (US)

(72) Inventors: Lee E. Zumdome, Bettendorf, IA (US); Elijah B. Garner, Bettendorf, IA (US)

(73) Assignee: Deere & Company, Moline, IL (US)

( * ) Notice: Subject to any disclaimer, the term of this patent is extended or adjusted under 35 U.S.C. 154(b) by 108 days.

(21) Appl. No.: 14/170,403

(22) Filed: Jan. 31, 2014

(65) Prior Publication Data

US 2015/0216115 A1 Aug. 6, 2015

(51) Int. Cl.
*A01C 7/04* (2006.01)
*A01C 7/20* (2006.01)

(52) U.S. Cl.
CPC . *A01C 7/046* (2013.01); *A01C 7/04* (2013.01); *A01C 7/20* (2013.01)

(58) Field of Classification Search
CPC .............. A01C 7/04; A01C 7/00; A01C 7/20; A01C 7/046; A01C 7/044; A01C 7/042
See application file for complete search history.

(56) References Cited

U.S. PATENT DOCUMENTS

| | | | |
|---|---|---|---|
| 5,170,909 A | 12/1992 | Lundie et al. | |
| 5,842,428 A | 12/1998 | Stufflebeam et al. | |
| 6,273,010 B1 | 8/2001 | Luxon | |
| 6,352,042 B1 | 3/2002 | Martin et al. | |
| 7,093,548 B2 | 8/2006 | Eben et al. | |
| 7,152,542 B2 | 12/2006 | Eben et al. | |
| 7,162,963 B2 | 1/2007 | Sauder et al. | |
| 7,699,009 B2 | 4/2010 | Sauder et al. | |
| 7,798,080 B2 | 9/2010 | Sauder et al. | |
| 8,746,159 B2 | 6/2014 | Garner et al. | |
| 2007/0107644 A1 | 5/2007 | Sauder et al. | |
| 2012/0067260 A1* | 3/2012 | Garner | A01C 7/042 111/171 |

FOREIGN PATENT DOCUMENTS

WO 2010059101 A1 5/2010

OTHER PUBLICATIONS

European Serch Report for Related Application No. EP15152267, Dated June 18, 2015.

* cited by examiner

*Primary Examiner* — Christopher J Novosad
(74) *Attorney, Agent, or Firm* — Ingrassia, Fisher & Lorenz PC

(57) ABSTRACT

A seed-double eliminator is described for a seeding machine that moves seed along a seed path. The seed-double eliminator may include a pocket with a pocket opening exposed to the seed path and a pocket cavity extending away from the seed path. A flexible extension may extend from within the pocket cavity toward the seed path. The flexible extension may be disposed to contact at least one seed of a seed-double pair being moved along the seed path by the seeding machine in order to remove the at least one seed from the seed path.

19 Claims, 13 Drawing Sheets

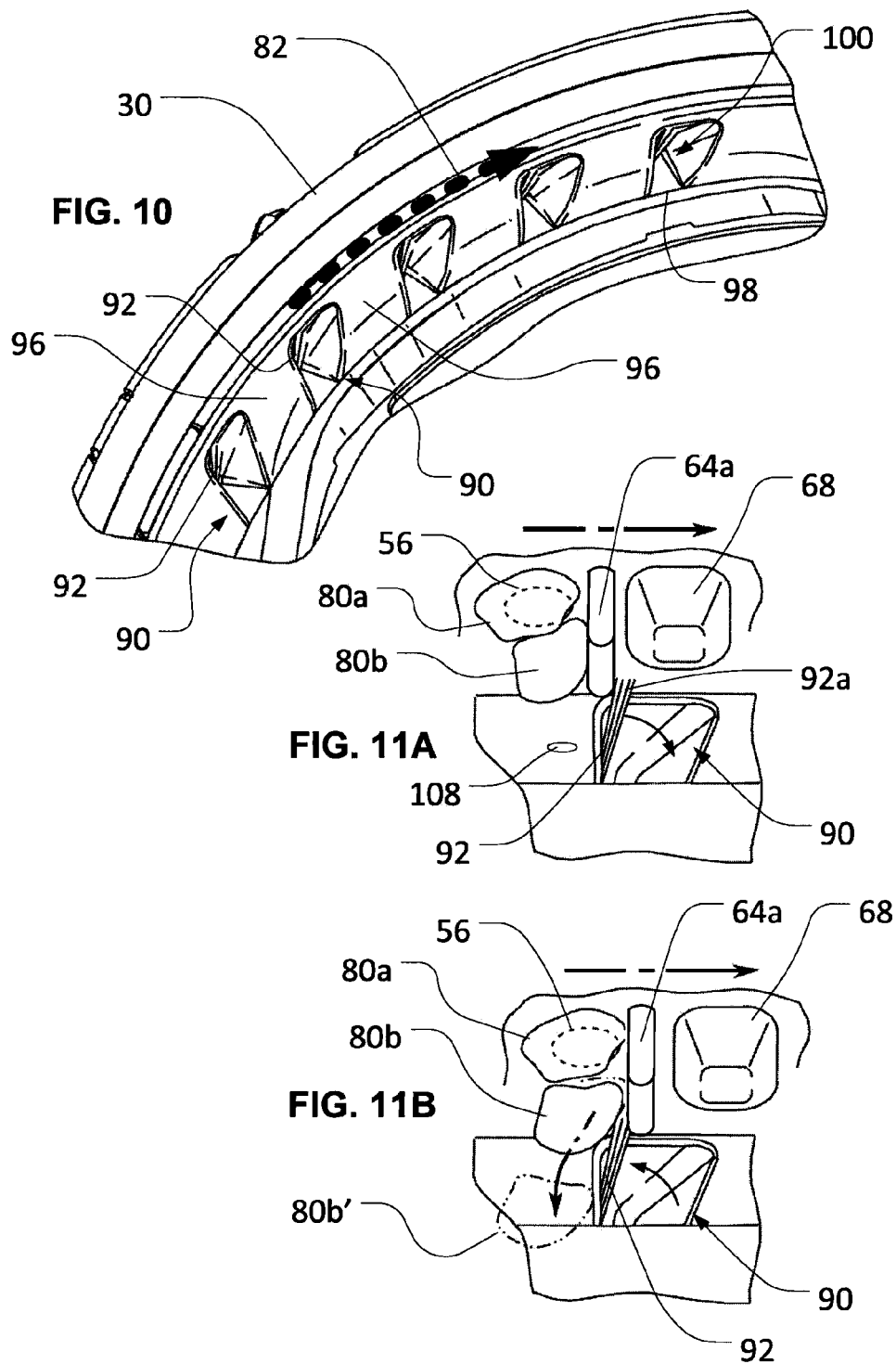

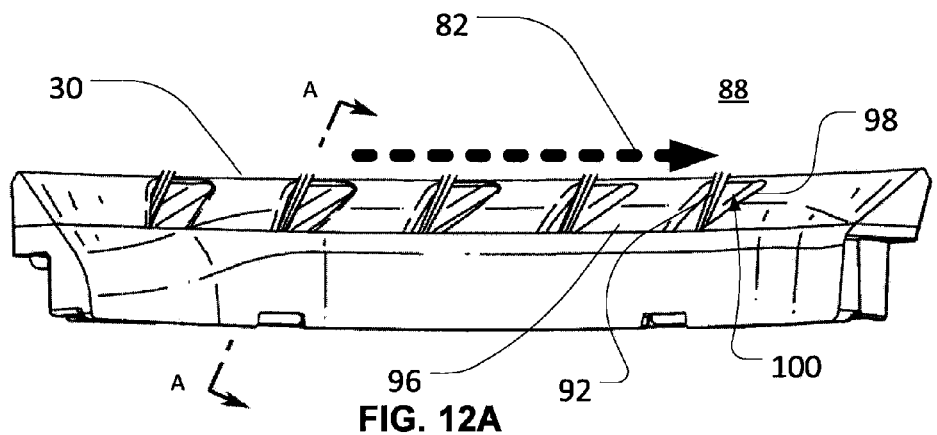
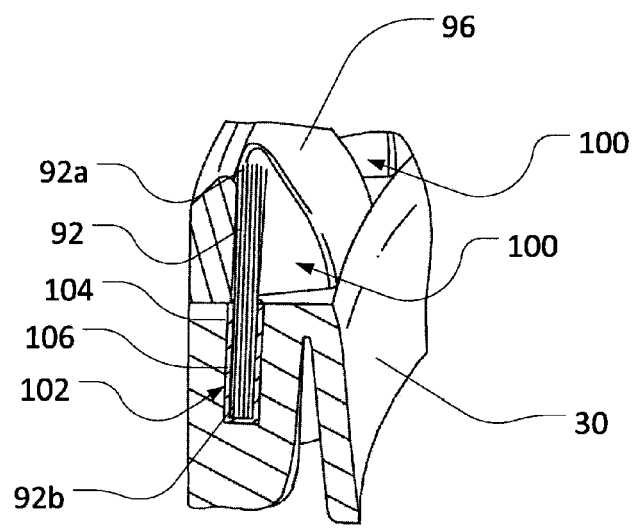
FIG. 12A
FIG. 12B

SEED-DOUBLE ELIMINATOR FOR A PLANTING UNIT

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

The following relates to planting units for a seeding machine or planter, including planting units having seed meters.

BACKGROUND OF THE DISCLOSURE

Various types of seed meters have been developed that use an air pressure differential, either vacuum or positive pressure, to adhere seed to a metering member. The metering member takes seed from a seed pool and sequentially discharges single seeds at another location. (In some cases, multiple seeds may be discharged at a time.) One common type of seed meter is shown in U.S. Pat. No. 5,170,909. There, a seed disk contained in a housing is used to meter the seed. A seed pool is positioned on one side of the disk at a lower portion thereof while vacuum is applied to the opposite side of the disk. As the disk is rotated, individual seeds from the seed pool are adhered by the vacuum to apertures that extend though the disk. When the seed reaches a desired release position, the vacuum is terminated, allowing the seed to drop from the disk.

In this and other configurations of seed meters (and other seed transport devices), it may be useful to ensure that seed doubles are eliminated. A seed double may occur, for example, when two (or more) seeds are captured by a single portion of a seed meter (e.g., a vacuum aperture of a seed meter) or device for transport between locations (e.g., between a seed pool and a release position for the seed). Because it may be desirable to plant (or otherwise process) only one seed at a time, it may be useful to provide an apparatus that eliminates such seed doubles.

SUMMARY OF THE DISCLOSURE

A seed-double eliminator, and a planter having a seed-double eliminator, are disclosed, for removing seed doubles from a seed meter or other similar apparatus.

A seeding machine may be configured to move seed along a seed path with a metering member. In certain embodiments, a seed-double eliminator (or planter) may include a pocket with a pocket opening exposed to the seed path and a pocket cavity extending away from the seed path. A flexible extension, such as a brush, may extend from within (or near) the pocket cavity toward the seed path. The flexible extension may be disposed to contact at least one seed of a seed-double pair being moved along the seed path by the metering member in order to remove the at least one seed from the seed path.

In certain embodiments, the pocket may be included inside a housing of the metering member. The pocket may be included upstream of a seed pool, with respect to the seed path, and downstream of a seed release position. The pocket may be configured to receive a portion of the flexible extension within the pocket cavity when the flexible extension is deflected by the metering member. The pocket opening may be larger than an average diameter of the seed.

Various other embodiments are contemplated, within the scope of the discussion herein.

BRIEF DESCRIPTION OF THE DRAWINGS

FIG. 10 is an enlarged partial perspective view of certain seed-double eliminators of FIG. 8;

FIGS. 11A and 11B are enlarged partial perspective views of an example operation of a seed-double eliminator of FIG. 10;

FIG. 12A is a perspective view of a seed-double eliminator insert of FIG. 9;

FIG. 12B is a sectional view of the seed-double eliminator insert of FIG. 12A, taken along plane A-A of FIG. 12A;

Like reference symbols in the various drawings indicate like elements.

DETAILED DESCRIPTION

The following describes one or more example embodiments of the disclosed seed-double eliminator, as shown in the accompanying figures of the drawings described briefly above. Various modifications to the example embodiments may be contemplated by one of skill in the art.

As also noted above, it may be useful to provide an apparatus to eliminate seed doubles within a planting unit (e.g., a seeding machine or associated planter). For example, a disk-shaped (or other) metering member within the planting unit may move seed along a generally circular (or other) seed path from a seed pool to an elevated release position. Seed doubles may sometimes be formed on such a metering member, and may be carried along the circular path, potentially resulting in sub-optimal seed delivery (e.g., poor or failed transport for final planting by a seed delivery system). A seed-double eliminator may accordingly assist in more efficient and successful seed delivery by removing one or more seeds from various seed doubles on the metering member. (It will be understood that "double," as used herein, may refer to any grouping of multiple seeds, including groupings of three or more seeds.)

In one embodiment of a seed-double eliminator, various pockets may be formed in a housing of a seed meter, with pocket openings adjacent to a seed path defined by a metering member of the seed meter, and with pocket cavities extending away from the pocket openings and the seed path. Various flexible extensions (e.g., various flexible brushes) may be configured to extend from the pockets toward (and into) the seed path of the metering member. For example, each pocket in the seed meter housing may include a brush mount within the pocket cavity with a flexible brush extending therefrom through the pocket opening and toward (including, in certain configurations, into) the seed path. Through contact with one or more seeds included in various seed doubles, such brushes (or other flexible extensions) may act to remove the one or more seeds from the metering member, thereby reducing the number of seed doubles that reach the release position.

Notably, seeds within a seed double may extend farther away from the metering member than a single seed being carried by the metering member. In addition to other benefits, such flexible members may take advantage of this phenomenon in order to more selectively eliminate seed doubles.

Figure 1:
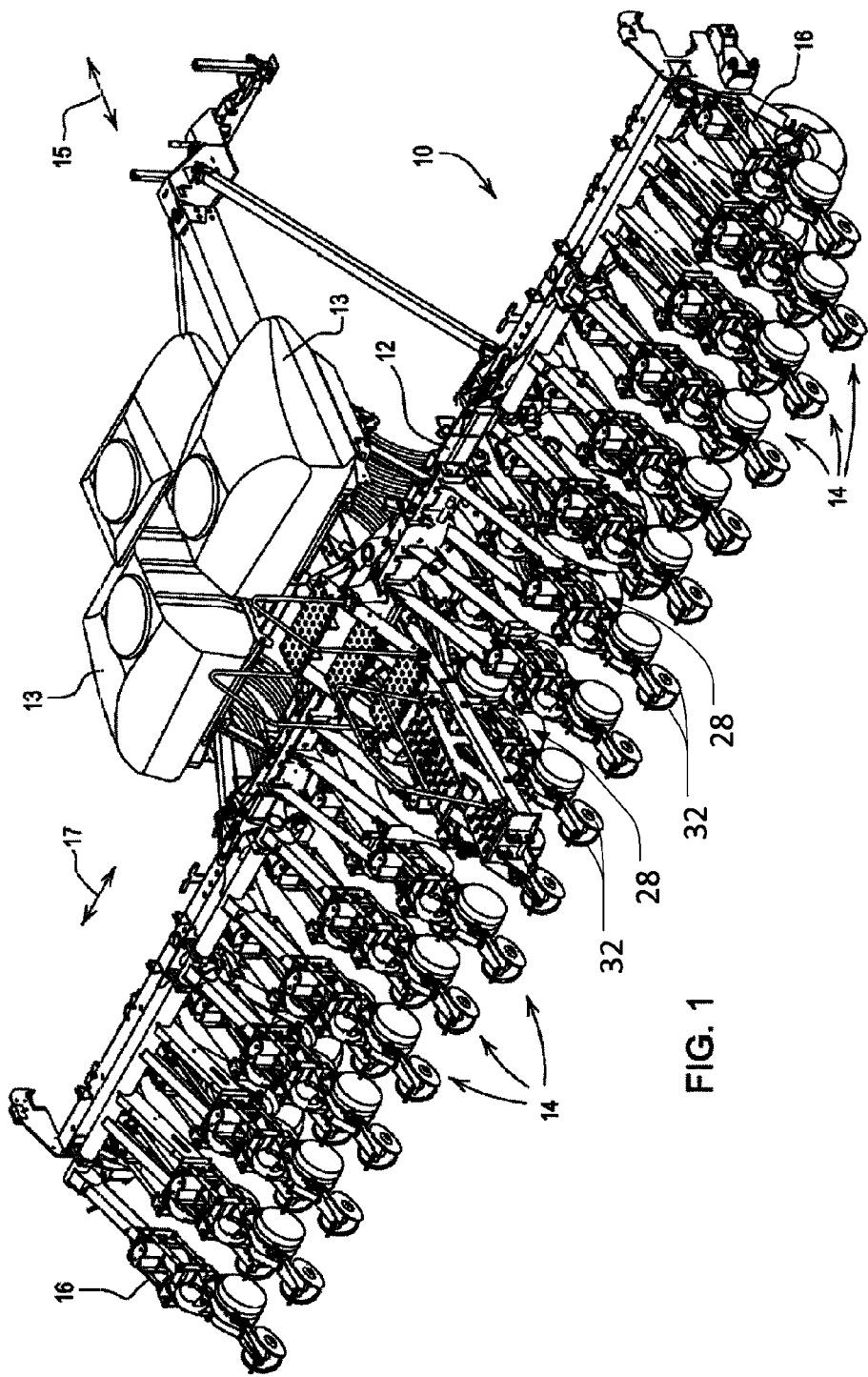
FIG. 1 is a perspective view of a common agricultural planter.

Referring now to FIG. 1, example agricultural seeding machine 10 is shown as a row crop planter. It will be understood that various other configurations may also be possible and that the disclosed seed-double eliminator may be used in a variety of agricultural machinery or other settings. Seeding machine 10 may include central frame 12 on which a plurality of individual planting units 14 may be mounted. Seeding machine 10 may be oriented with a fore-aft direction shown by arrow 15 and a transverse direction shown by arrow 17. Each planting unit 14 may be coupled to central frame 12 by a parallel linkage (e.g. linkage 16) so that individual planting units 14 may move up and down to a limited degree relative to frame 12. Large storage tanks 13 may hold seed that may be delivered pneumatically to a mini-hopper on each planting unit.

Figure 2:
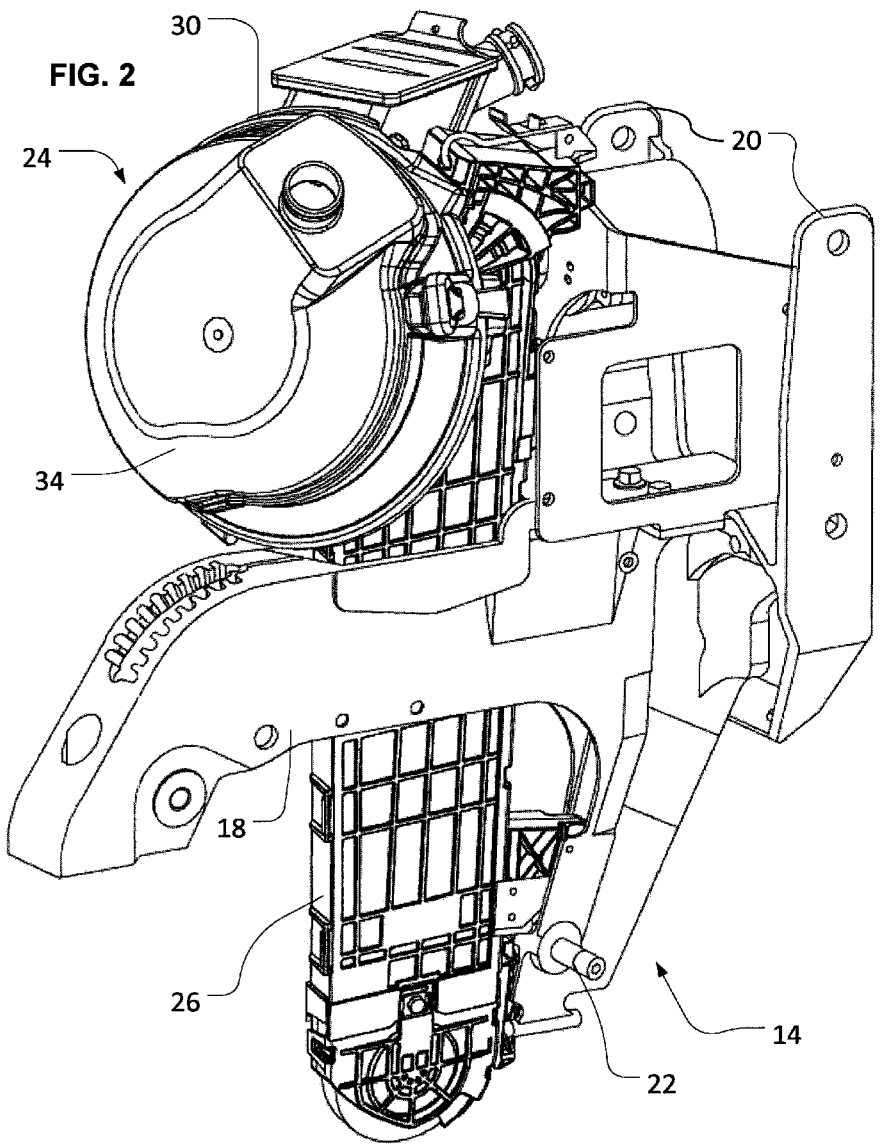
FIG. 2 is a side perspective view of a planting unit frame, seed meter and seed delivery system.

Referring also to FIG. 2, each planting unit 14 may be mounted, in various known ways, to frame member 18. (It will be understood that the disclosed seed-double eliminator may be utilized with planting unit 14, or with various other seed-handling or other devices (not shown).) Frame member 18 may include a pair of upstanding arms 20 at the forward end thereof. Arms 20 may be coupled to the rearward ends of parallel linkage 16. Furrow opening disks 28 (FIG. 1) may be attached to shaft 22 in a known manner to form an open furrow in the soil beneath the seeding machine into which seed is deposited. Closing and packing wheels 32 (FIG. 1) may also be mounted to frame member 18 in a known manner to close the furrow over the deposited seed and to firm the soil in the closed furrow. Seed meter 24 and seed delivery system 26 may also be attached to the frame member 18 of the planting unit.

Figure 3:
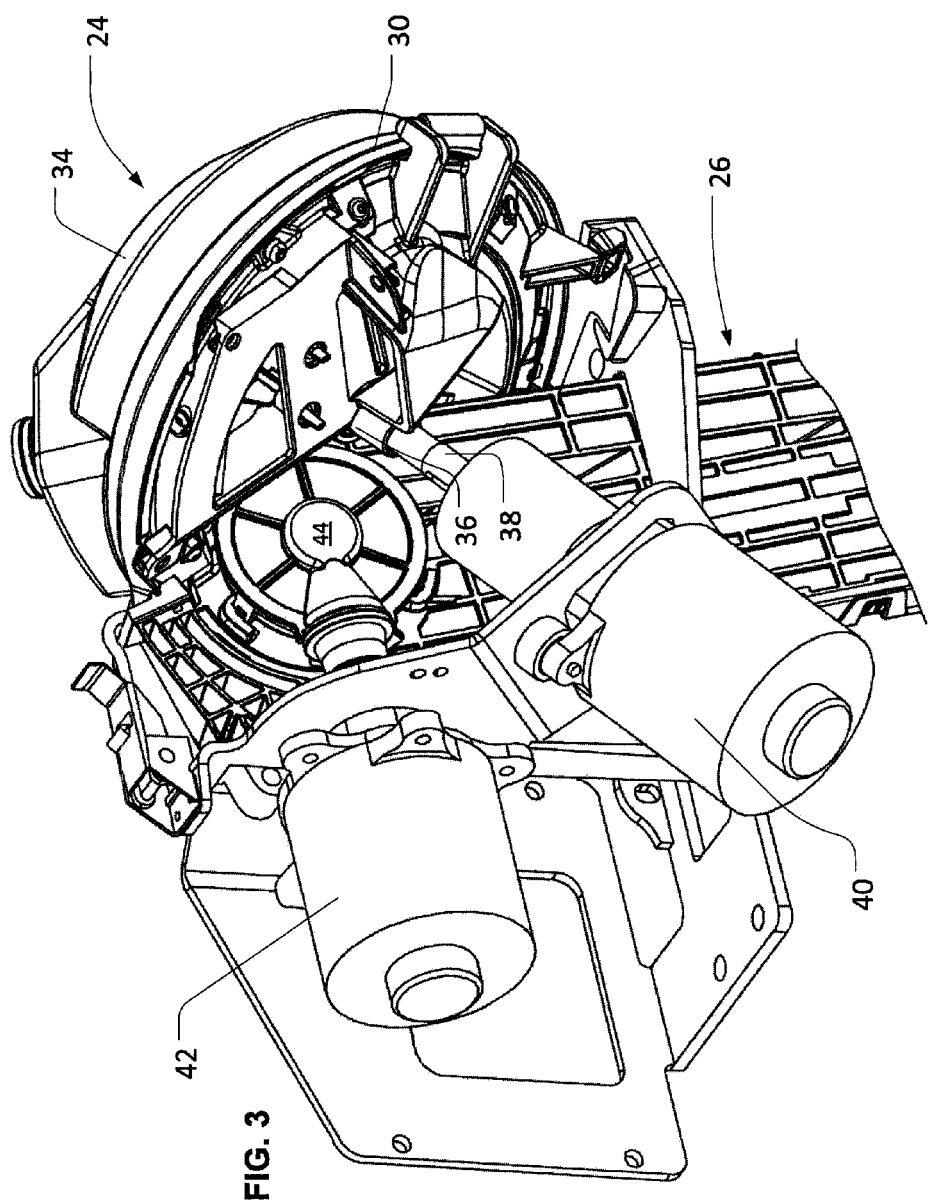
FIG. 3 is an enlarged perspective view of the seed meter and delivery system drives.
Figure 4:
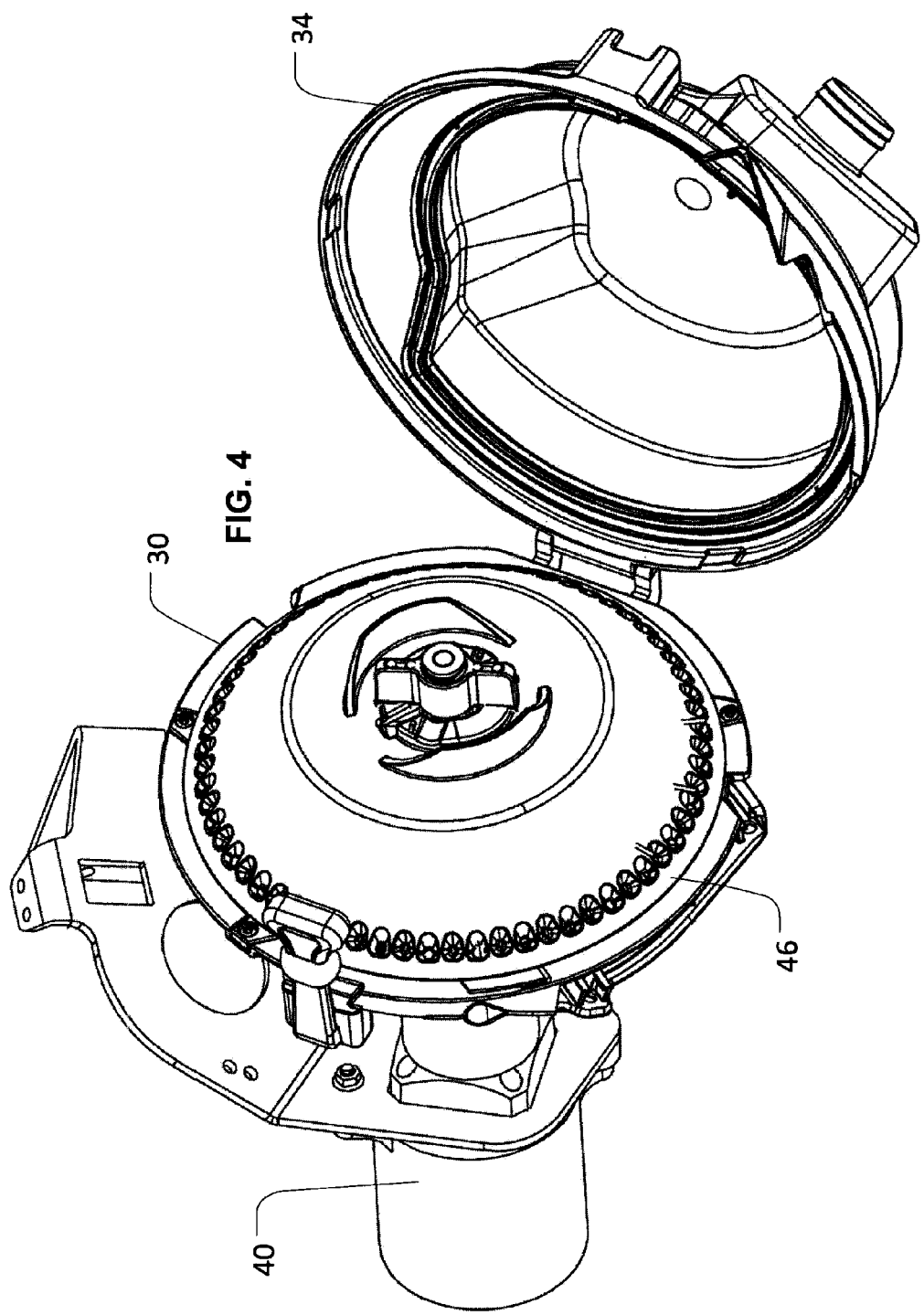
FIG. 4 is a perspective view of the seed meter with the cover open illustrating the metering member.

Referring also to FIGS. 3 and 4, seed meter 24 may include housing 30 and cover 34. Housing 30 and the cover 34 may be coupled to one another by complementary hinge features on housing 30 and cover 34, respectively. Drive spindle 36 may be carried by the housing 30 and may be couple to output shaft 38 of electric motor 40, in order to drive the seed meter when in the assembled position shown in FIG.

Delivery system 26 may be driven by electric motor 42. The output shaft of motor 42 may be connected to delivery system 26 through right-angle drive 44. While electric motors have been shown to drive both the seed meter and the seed delivery system, it will be appreciated by those skilled in the art that other types of motors, (e.g., hydraulic, pneumatic, and so on) can be used as well as various types of mechanical drive systems.

Figure 5:
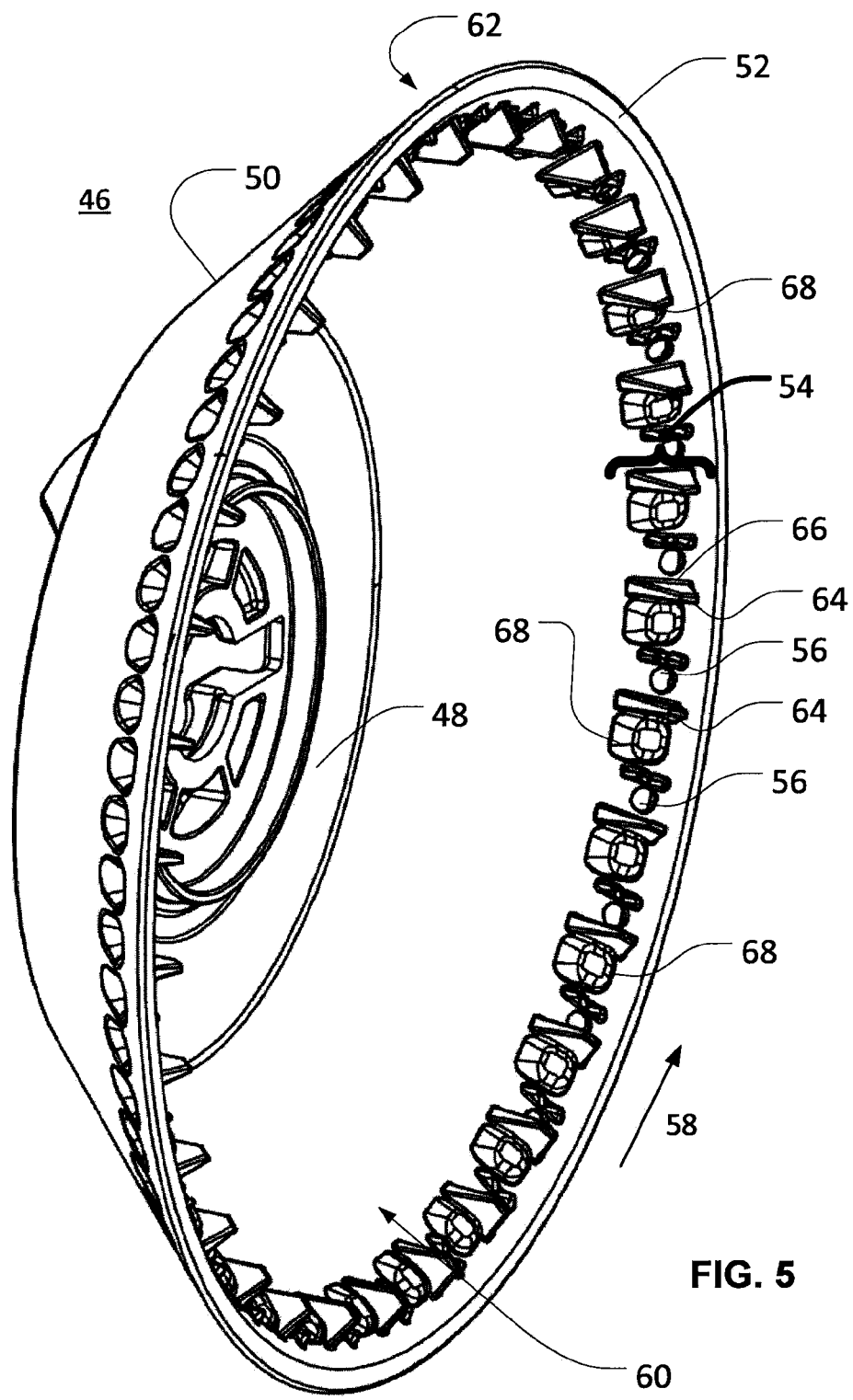
FIG. 5 is a perspective view of a metering member included in the seed meter of FIG. 4.
Figure 6:
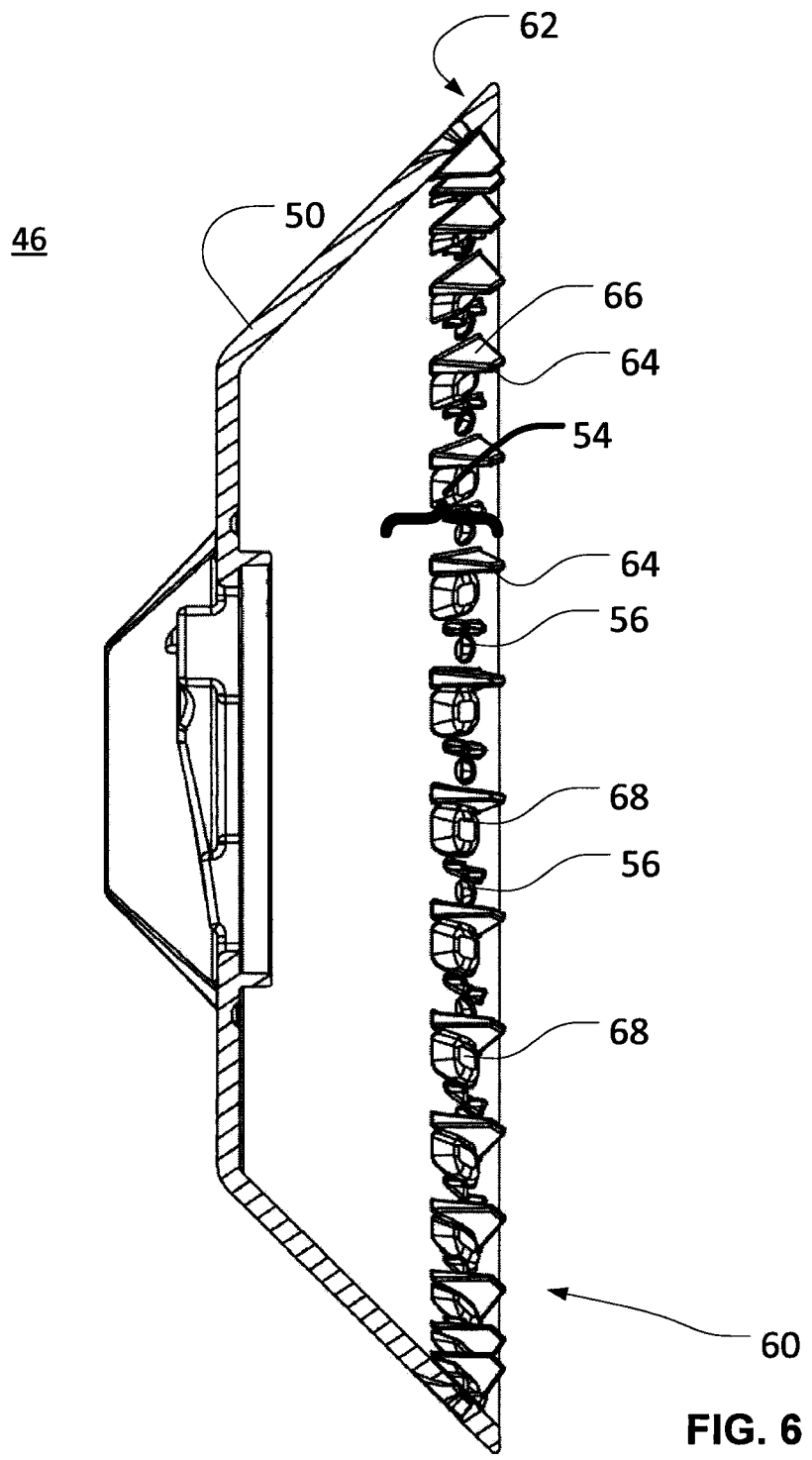
FIG. 6 is side cross-section of the metering member of FIG. 5.

Referring also to FIGS. 5 and 6, metering member 46 of seed meter 24 is shown in greater detail. Metering member 46 may be (as shown) a concave bowl-shaped body. The bowl-shaped body may have base portion 48 from which side wall 50 extends. Side wall 50 may terminate in outer edge 52. Adjacent outer edge 52, side wall 50 may include rim portion 54, as indicated by bracket in FIGS. 5 and 6, which may extend radially outwardly and axially toward outer edge 52. Within rim portion 54, an annular array of apertures 56 may extend between the inner and outer surfaces of side wall 50.

Metering member 46 may be mounted in meter housing 30 for rotation in the direction of arrow 58 in FIG. 5. In operation, as the metering member rotates, individual seeds from seed pool 60 (see also, e.g., FIG. 8A) located at a bottom portion of metering member 46 may adhere to apertures 56 on the inner surface of side wall 50 and thereby be sequentially carried upward to release position 62 at an upper portion of metering member 46. A series of raised features or projections, such as paddles 64, may extend from the inner surface of side wall 50. In certain embodiments, one paddle may be located behind each aperture 56, with respect to direction of rotation 58. Each paddle 64 may, accordingly, form a confronting surface 66 behind the associated aperture in the direction of rotation to push a seed adhered to the aperture into delivery system 26 as described below. In certain embodiments, metering member 46, as installed in housing 30, may be oriented at an angle from vertical (not shown in FIG. 6).

In certain embodiments, metering member 46 may include raised geometry 68 between sets of paddles 64. In operation, such geometry 68 may sometimes serve to orient individual seeds in a seed double for better removal by a seed-double eliminator. For example, with multiple seeds 80 being carried between a set of paddles 64, geometry 68 may permit one seed to seat at or near the associated aperture 56, while orienting the other seed (or seeds) away from side wall for easier removal.

A metering member (or other seed transport device) may be formed as one piece or constructed of multiple pieces, and may differ in various ways from example metering member 46 depicted in the various figures herein. It will be understood, accordingly, that the disclosed seed-double eliminator may be used with a metering member such as metering member 46, or with various other types of seed transport devices.

Figure 7:
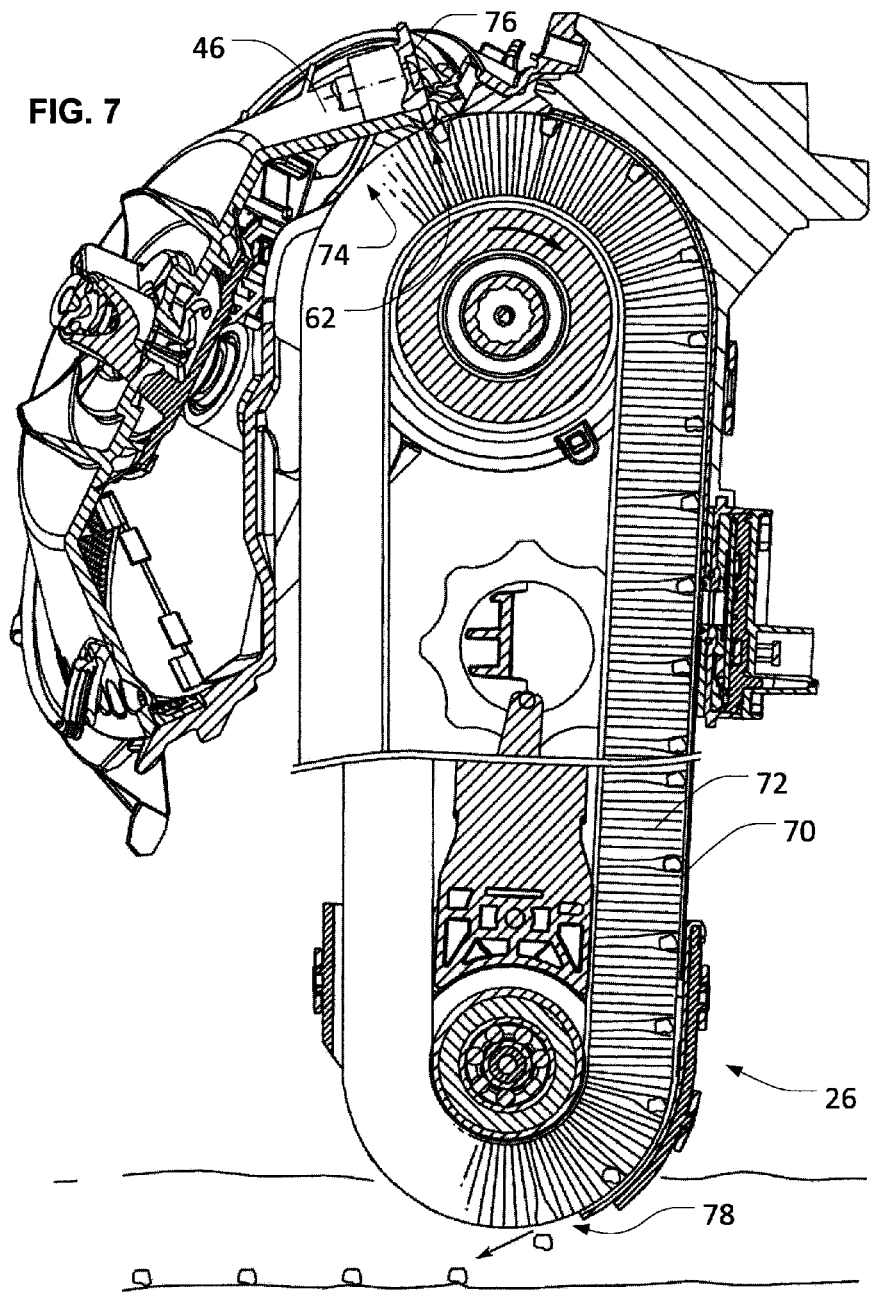
FIG. 7 is a side sectional view of aspects of one embodiment of the seed meter and seed delivery system.

As noted above, seed pool 60 may formed at the bottom of metering member 46. Vacuum may be applied to the outer surface of side wall 50, causing individual seeds to be adhered to various apertures 56 as the apertures travel through the seed pool. As metering member 46 rotates as shown by arrow 58, seed may thereby be moved upward to release position 62 at the upper portion of metering member 46. Release position 62 may be slightly past the top or 12 o'clock position on the circular path of travel of the seed such that the seed is moving somewhat downward at the release position. Seed delivery system 26 may be positioned beneath the upper portion of metering member 46 at the release position 62 to take the seed from the metering member (e.g., as shown in FIGS. 7 and 8A). (It will be understood that other orientations of metering member 46 (or other components) may be possible. Accordingly, although terms such as "upper" and "lower" may be used to describe features as depicted in the various figures, these are not intended to limit the disclosure to the particular orientation depicted. For example, at a particular orientation, a feature described herein as "upper" may be located vertically in line with, but to the right (or left) of a feature described herein as "lower.")

Referring also to FIG. 7, delivery system 26 may include housing 70 partially enclosing bristles 72, which may generally travel in a clockwise direction (in FIG. 7) within housing 70. Upper opening 74 may be formed in housing 70 in order to allow seed to enter housing 70 (e.g., from metering member 46). Bristles 72 may extend through opening 74 in order to receive seed from metering member 46. (As also noted above, it will be understood that other configurations may possible. For example, delivery system 26 may be oriented horizontally or at an angle otherwise deviating from vertical, in which case opening 75 may be generally viewed as an inlet opening to delivery system 26.)

Ejector 76 may ride on the outer surface of metering member 46, with projections from a star wheel on ejector 76 extending, sequentially, into apertures 56 in order to force seed out of apertures 56. Ejector 76, which may be biased against metering member 46 with a spring (not shown) may, accordingly, "walk" along metering member 46 such that successive projections of the star wheel sequentially eject seeds, at release position 62, from successive apertures 56. These ejected seeds may be captured by rotating bristles 72 and thereby carried to seed ejection point 78.

As noted above, metering member 46 may be intended to carry seeds individually and sequentially between seed pool 60 and release position 62 (e.g., to carry a single seed between each pair of paddles 64, secured by vacuum through the associated aperture 56). In various instances, however, multiple seeds from seed pool 60 may become lodged between a pair of paddles 64. As noted above, this may be referred to as a "seed double" (although, in various instances, more than two seeds may be included). The presence of such seed doubles may detrimentally affect the efficiency and efficacy of a planting operation.

Figure 8:
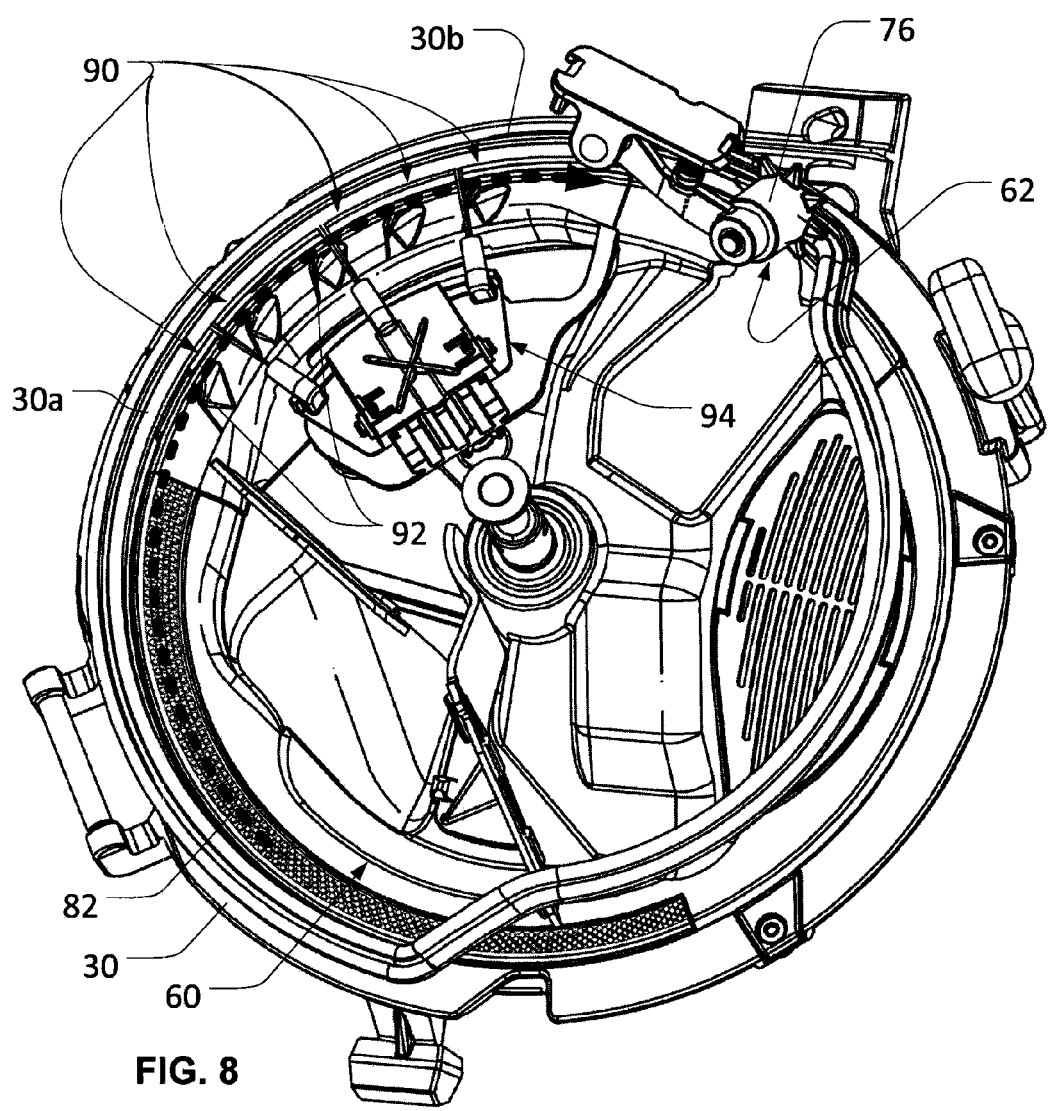
FIG. 8 is a perspective view of certain internal components of the seed meter of FIG. 4, including various seed-double eliminators.
Figure 9:
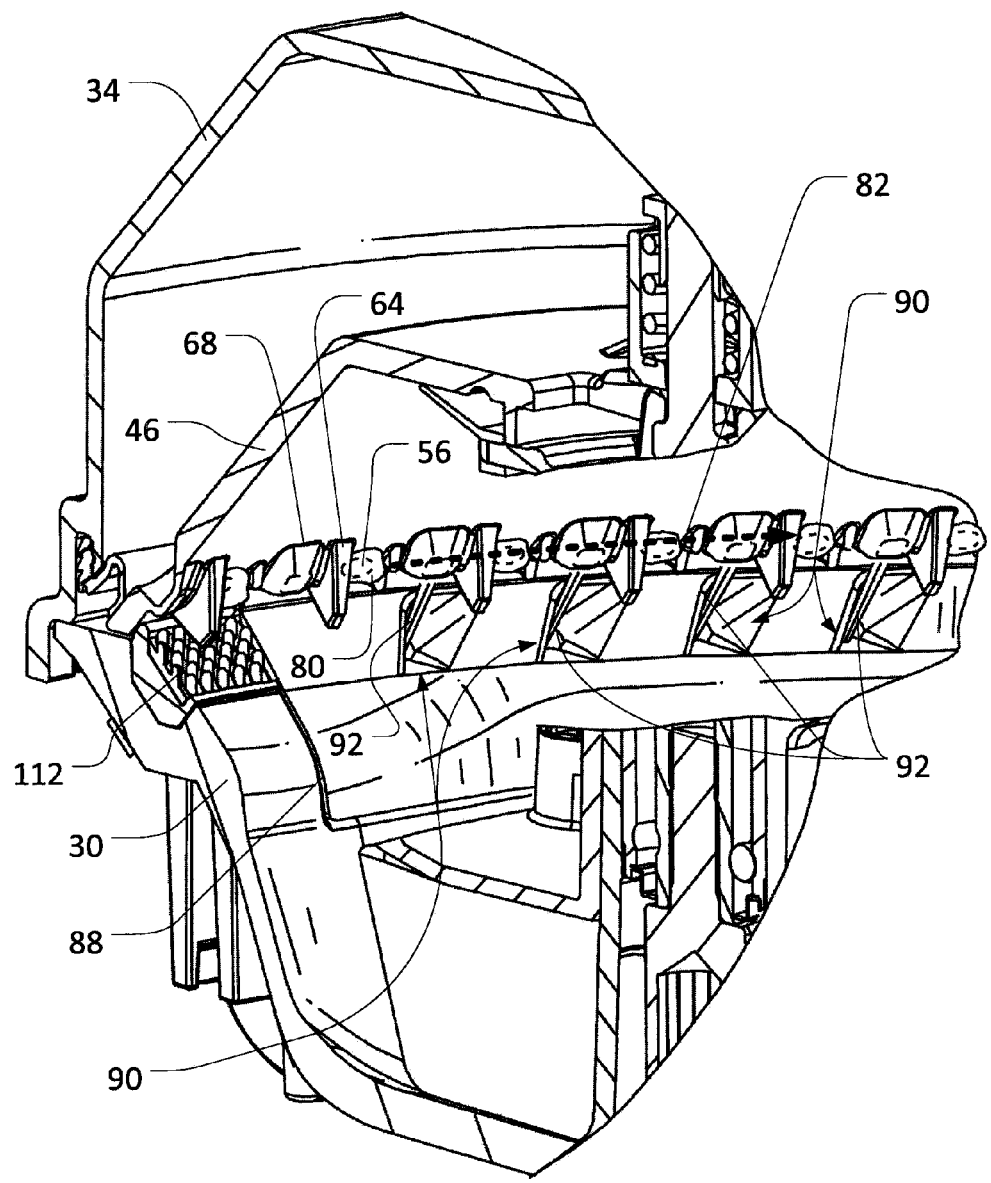
FIG. 9 is a perspective view of a portion of the seed meter of FIG. 8, with a seed meter cover in place.

Referring also to FIGS. 8-10, various example seed-double eliminators are depicted. It will be understood that various other configurations may be possible, and that a seed-double eliminator contemplated by this disclosure may be utilized with a variety of seeding (and other) machines.

Metering member 46 (not shown in FIGS. 8 and 10) may carry various seeds (not shown in FIG. 8) along seed path 82 (e.g., a generally circular path along rim portion 54 of metering member 46), which may generally extend from seed pool 60 to release position 62 in a clockwise direction (as depicted in FIGS. 8 and 10). (It will be understood that the boundaries of seed path 82 may be indicated only approximately in the various figures, and that in various instances and embodiments seeds 80 may be carried in the direction of path 82 wholly, partially, or not at all between the arrows representing path 82 in the figures.)

A seed-double eliminator may include various pockets 90, with various flexible extensions (e.g., brushes 92) extending toward seed path 82 at locations adjacent to pockets 90. As depicted in FIG. 8, various pockets 90 may be located along seed path 82 between seed path 60 and release position 62 (and, generally, above seed pool 60 and below release position 62). Various brushes 92 (or other flexible extensions, such as flexible rods or posts, flexible strips, and so on) may extend toward seed path 82 near the various pockets 90. Referring in particular to FIG. 9, it can be seen that brushes 92 may extend toward seed path 82 in a direction that is generally radially and axially inward, with respect to bowl-shaped metering member 46.

In certain embodiments, brushes 92 (or other flexible extensions of a seed-double eliminator) may extend fully into seed path 82. In certain embodiments, brushes 92 (or other flexible extensions of a seed-double eliminator) may not extend fully into seed path 82. Further, although various brushes 92 may be depicted in FIGS. 8 and 9 as generally extending the same distance toward seed path 82, in other configurations various brushes 92 (or other flexible extensions) of a particular seed-double eliminator may extend various different distances toward seed path 82. For example, successive brushes (with respect to movement of a seed along seed path 82) may extend successively farther toward (and, potentially, into) seed path 82, in order to provide successively more aggressive contact with potential seed doubles.

Each pocket 90 may include pocket opening 98, which may be located generally adjacent to seed path 82. Each pocket may also include pocket cavity 100, which may open away from pocket opening 98 to define the internal space of pocket 90. In certain embodiments, pockets 90 may be formed integrally with housing 30. In certain embodiments, pockets 90 may be formed as part of a distinct insert (or other component), which may be mounted within housing 30. For example, pockets 90 may be formed as part of insert 88 (FIG. 9), which may be mounted within housing 30 (e.g., so that pockets 90 are oriented as depicted in FIGS. 8-10). Such a pocket-insert configuration may be useful, for example, if different pocket sizes or geometries (and/or different brush characteristics) may be useful for different types of seed 80, operating conditions, planter types, and so on.

Various numbers and configurations of pockets 90 may be provided. As depicted in FIGS. 8-10, for example, a plurality of individual pockets 90 may be provided at successive locations along seed path 82. In certain embodiments, transition surface 96 (see FIG. 10) may extend between sets of pockets 90. A particular transition surface 96 may, for example, be configured to direct seeds that are deflected out of seed path 82 back toward seed pool 60. In certain configurations, transition surfaces 96 may be configured to provide a generally smooth travel surface for seeds traveling along path 82 (e.g., as carried by metering member 46), with the curving slope of such transition surfaces 96 also tending to direct seed 80 downward toward seed pool 60 as seed 80 falls onto surface 96 from seed path 82. In certain configurations, transition surface 96 may include various textures, features, or other geometry. For example, transition surface 96 may be configured to have raised bumps or other contoured geometry similar to vibration strip 114 (FIG. 9), which may tend to assist in removing seed doubles from seed path 82 by vibrating such seed doubles as they pass across strip 114.

As depicted in FIGS. 8-10, each brush 92 may be mounted within a particular pocket 90 and may extend from within the associated pocket cavity 100 through pocket opening 98 toward seed path 82. Alternative configurations may also be possible. For example, as discussed in greater detail below, one or more brushes 92 (or other flexible extensions) may be mounted outside of the associated pockets 90 (not shown). In certain embodiments, multiple brushes 92 (or other flexible extensions) may be mounted within, or be otherwise associated with, a particular pocket 90.

As depicted in FIGS. 8-10, pockets 90 may include pocket openings 98 or pocket cavities 100 of generally similar (or identical) configuration. In certain embodiments, various pockets 90 may include pocket openings 98 or pocket cavities 100 of differing configurations. Accordingly, various pockets 90 of the depicted succession of pockets 90 may exhibit a generally identical nominal size and geometry for their respective pocket openings 98 and pocket cavities 100, or various pockets 90 may exhibit different nominal sizes and geometries. The configuration of a particular pocket 90 (e.g., pocket size and geometry) may be selected, for example, to correspond to a particular seed type, operating condition, planter type, and so on. In certain embodiments, a pocket configuration may be selected based upon the location of a particular pocket 90 along seed path 82. For example, pockets 90 along a more vertically oriented portion of housing 30 (e.g., housing portion 30a) may tend to be shallower or otherwise contoured to prevent seed 80 that is dislodged from seed path 82 from becoming caught within one of the associated pocket cavities 100. This may be useful, for example, in light of the potential tendency of gravity to pull seeds somewhat toward the upstream (i.e., lower) internal walls of pocket cavities 100 along portion 30a of housing 30 as seed 80 falls away from seed path 82. In contrast, pockets 90 along more horizontally oriented portion of housing 30 (e.g., housing portion 30b) may be configured with different geometry, in light of the potential tendency of gravity to pull seeds downward out of pockets 90 along housing portion 30b, rather than into the interior walls of the associated pocket cavities 100 (as may occur along housing portion 30a). It will be understood that various other configurations are also possible, and that various other considerations may also be relevant to the configuration of various pockets 90.

In certain embodiments, brushes 92 may be configured to extend a generally uniform distance out of (or away from) various pockets 90. In certain embodiments, various brushes 92 may be configured to extend different distances out of (or away from) various pockets 90. For example, brushes 92 further downstream along seed path 82 may extend a greater (or smaller) distance toward seed path 82 than brushes 92 further upstream along seed path 82. Similarly, in certain embodiments, the distance that various brushes 92 extend toward seed path 82 may be adjustable. For example, various brushes 92 may be configured to be slidable within a barrel mount or similar mounting configuration of the various brushes 92 (not shown in FIGS. 8-10).

In this light, for example, brushes 92 along housing portion 30b may extend farther into seed path 82 than brushes 92 along housing portion 30a (or vise versa). Accordingly, pockets 90 along housing portion 30b may include deeper pocket cavities 100 or wider pocket openings 98 in order to fully receive the longer brushes 92 as the brushes 92 are deflected by paddles 64, while pockets 90 along housing portion 30a may include shallower pocket cavities 100 or smaller pocket openings 98. Because of the orientation of seed path 82 along housing portion 30b, seeds deflected by longer brushes 92 may tend to fall away from the associated pockets 90, which may allow such pockets 90 to be configured with less concern for trapping seeds 80. For example, pockets 90 in housing portion 30b may be configured to include deeper pocket cavities 100. Similarly, shallower pocket cavities 100 along housing portion 30a may tend to prevent seeds 80 from becoming lodged within the associated pockets 90 (e.g., as those seeds are deflected or otherwise fall away from seed path 82). Various other configurations may also be possible, including configurations that are particular to a particular seed type, operating condition, planter type, and so on.

Still referring to FIGS. 8-10, and as also noted above, brushes 92 may come into contact with various seed 80 being carried along seed path 82 by metering member 46, by way of the extension of brushes 92 toward (including, potentially, into) seed path 82. In certain embodiments, brushes 92 may be configured such that they either do not contact single seeds 80 being carried between a set of paddles 64 or do not contact single seeds 80 with sufficient force to dislodge the single seeds 80 from seed path 82 (e.g., with force that is insufficient to overcome the vacuum applied to a seed via aperture 56).

Brushes 92 may also be configured such that when a seed double is carried between paddles 64 (or otherwise), brushes 92 may contact at least one seed 80 of the seed double with sufficient force to dislodge the extra seed 80 from seed path 82. For example, as noted above, the extension of brushes 92 toward seed path 82 may be configured such that brushes 92 do not contact single seeds 80 (or contact single seeds 80 with insufficient force to dislodge them from path 82), but brushes 92 do contact seed doubles (or one or more seeds 80 included therein) with sufficient force to dislodge from seed path 82 at least one seed 80 included in the double. This may be possible, for example, for a particular orientation of brushes 92 and a particular seed type, because the physical arrangement of seed doubles may cause various seeds 80 included in the double to project farther out of seed path 82 than would a single seed 80. Further, vacuum force through aperture 56 may be less effective at retaining multiple seeds 80 (i.e., a seed double) between paddles 64 than at retaining single seeds, and raised geometry 68 may tend to orient seeds 80 of a seed double further away from metering member 46 (and closer to brushes 92) than seeds 80 that are firmly seated in aperture 56. Accordingly, with brush 92 configured to extend a certain distance toward seed path 82, brush 92 may tend to contact seeds within a seed double with a greater effective force, including as measured relative to a vacuum-based retention force, than the force with which it may tend to contact single seeds (if the single seeds are contacted at all).

Referring also to FIGS. 11A and 11B, an example seed double including seeds 80a and 80b may be carried by metering member 46 between a set of paddles 64 (only leading paddle 64a of the set shown in FIGS. 11A and 11B). As leading paddle 64a reaches brush 92 (as in FIG. 11A), it may tend to deflect brush 92 out of its way and away from seed path 82. In certain embodiments, this may deflect brush 92 fully (or partially) into pocket cavity 100 within pocket 90. As paddle 64a passes brush 92 (as in FIG. 11B), brush 92 may then spring back out of pocket 90 to contact seed 80b of the depicted seed double. This contact may tend to dislodge seed 80b of the depicted seed double, while leaving seed 80a in its seat at aperture 56 as seed 80a may be located close enough to the wall of metering member 46 that brush 92 may not contact seed 80a (or may contact seed 80a with a force that is insufficient to dislodge seed 80a). In this way, the depicted seed-double eliminator (i.e., brushes 92 and pockets 90) may tend to enhance the ability of metering member 46 to delivery seed 80 individually and sequentially to seed delivery system 26. In certain embodiments, additional seed double eliminators (other than brushes 92 and pockets 90) may also assist in this functionality. For example radial seed-double eliminator 94 (FIG. 8) may also be mounted with housing 30 to help remove seed doubles from metering member 46.

Other configurations of a seed double may also be possible. In certain instances, for example, one or more seeds 80 of a seed double may rest on raised geometry 68 (not shown). In certain embodiments, various of brushes 90 may be configured to contact these seeds 80 in order to dislodge them from seed path 82. In certain embodiments, brushes 90 may be configured to contact seeds 80 of seed doubles of various configurations (e.g., seed doubles including seeds 80 on raised geometry 68, seed doubles as depicted in FIGS. 11A and 11B, and so on). In certain embodiments, certain brushes 90 may be configured for removal of seed doubles carried near aperture 56 (as depicted in FIGS. 11A and 11B), while other brushes 90 may be configured from removal of seed doubles carried on raised geometry 68. For example, certain brushes 90 may be configured with a length, thickness, bristle count, stiffness, and so on that is particularly suited to addressing seed doubles near aperture 56, while other brushes may be configured with a length, thickness, bristle count, stiffness, and so on that is particularly suited to addressing seed doubles near raised geometry 68.

It will be understood, with respect to the seed double depicted in FIGS. 11A and 11B (as well as various other seed doubles), that some contact between brushes 92 and seed 80a may occur in various embodiments, and that such contact may not necessarily dislodge seed 80a from seed path 82. For example, with brushes 92 extending an appropriate distance toward seed path 82, even if free ends 92a of brushes 92 contact seed 80a, the flexible deformation of brushes 92 may be large enough to allow seed 80a to pass without being dislodged (particularly in light of the retaining force provided by the associated aperture 56), but small enough to allow brush 92 to remove other seeds 80 of the seed double from seed meter 46.

Brushes 92 may be mounted with respect to housing 30 (or pockets 90) in various ways using various known attachment techniques. Referring to FIGS. 12A and 12B, for example, certain pockets 90 may include one or more barrel mounts 102, into which attached ends 92b of the associated brush(es) 92 may be inserted. In certain embodiments, attached ends 92b may be relatively permanently attached within the associated barrel mount 102 (or other attachment means). In certain embodiments, attached ends 92b may be removably inserted into barrel mount 102 (or otherwise removably secured with respect to housing 30). For example, attached ends 92b may be mounted within insert 106, which may be secured by a press-fit (or other removable) connection in bore 104 of housing 30. This may be useful, for example, in order to provide for easy replacement of brushes 92 as they become worn or when a different configuration of brushes 92 may be useful (e.g., in different operating conditions, for different seed types, and so on).

In certain configurations, one or more brushes 92 may be mounted outside of the associated pocket 90. For example, a particular brush 92 (not shown) may be inserted into a barrel mount at mounting location 108 (FIG. 11A), or elsewhere outside of the associated pocket 90. In such a case, for example, although a particular brush 92 (or other flexible extension) may be mounted outside of an associated pocket 90 (e.g., connected at attached ends 92b to housing 30 at mounting location 108), free ends 92a of such a brush 92 may still extend toward seed path 82 so as to contact seed-doubles being carried along seed path 82 at a location that is generally near the associated pocket 90. In this way, such a brush 92 may still be deflected by paddles 64 (or other features of metering member 46) into pocket 90 in order to allow passage of paddles 64 (and metering member 46) with minimal impedance and without imposing excessive wear on brush 92.

Various other configurations may be possible. For example, brushes 92 may be mounted with various orientations at various locations within (or near) various pockets 90. In certain embodiments, brushes 92 may be mounted to various locations on the side walls of pockets 90, or at various other locations within (or near) pockets 90. Similarly, brushes 92 may extend out of (or across) various pockets 90 at various angles, depending on the location and orientation of the relevant mounting, as well as various characteristics of brushes 92 themselves (e.g., brush stiffness, length, spread, and so on). In certain embodiments, it may be useful to mount a particular brush 92 with respect to a particular pocket 90 such that brush 92 tends to contact seed 80 toward the upstream end of pocket 90. This may, for example, tend to cause seed 80 to be dislodged from seed path 82 onto transition surface 96, rather than into pocket 90, before returning to seed pool 60.

Figure 13:
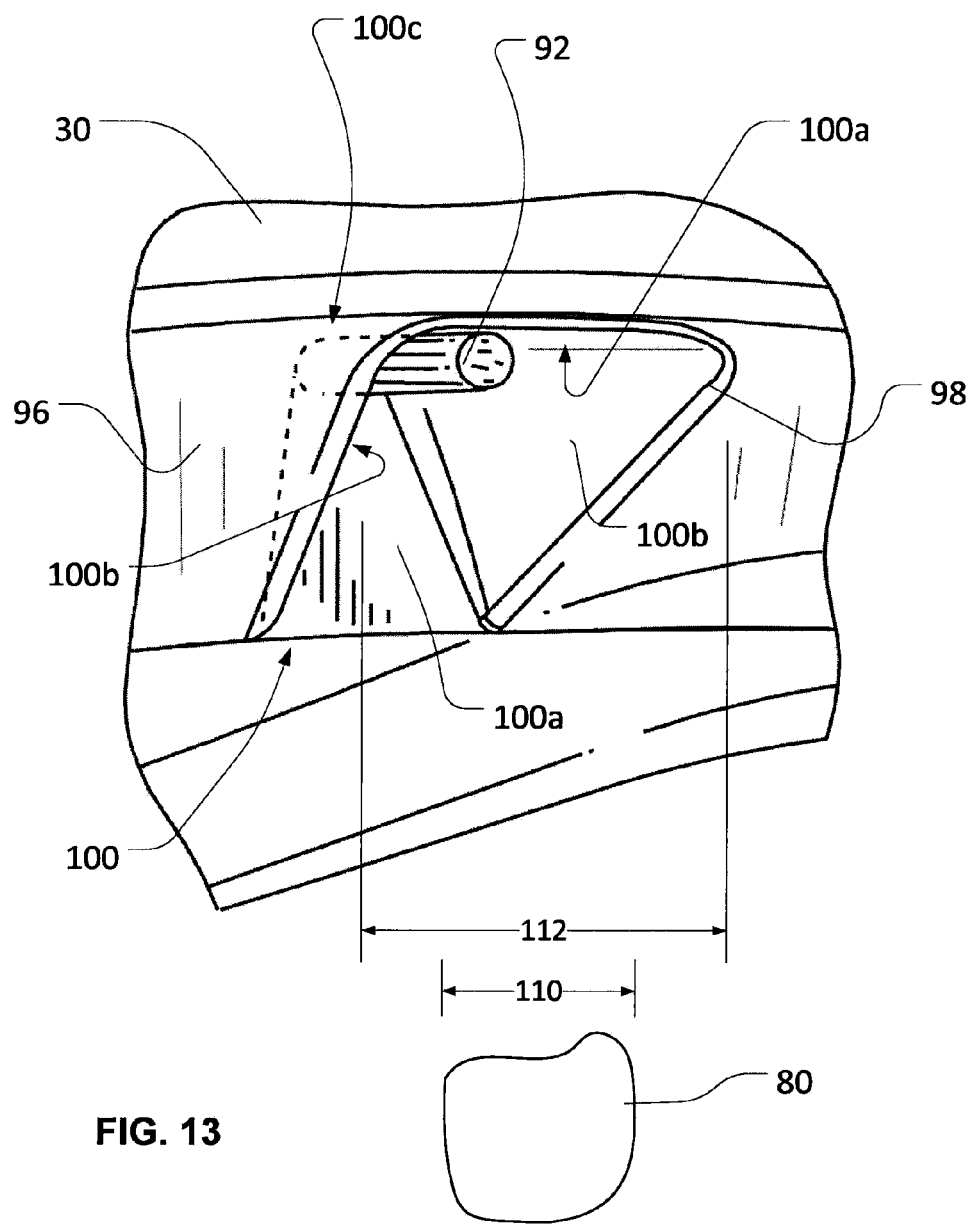
FIG. 13 is an enlarged perspective view of a seed-double eliminator of FIG. 8.
Figure 14A:
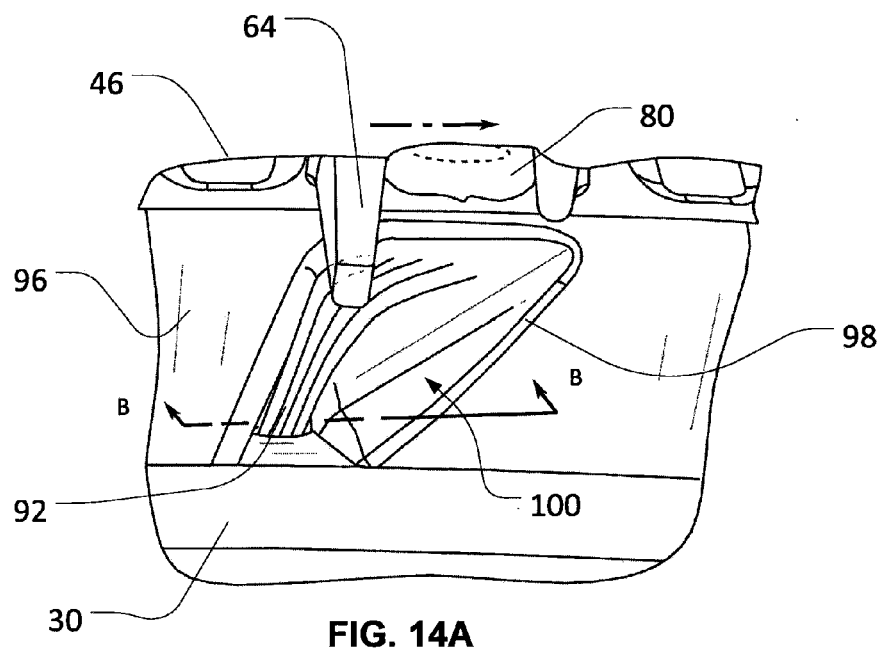
FIG. 14A is another enlarged perspective view of a seed-double eliminator of FIG. 8.
Figure 14B:
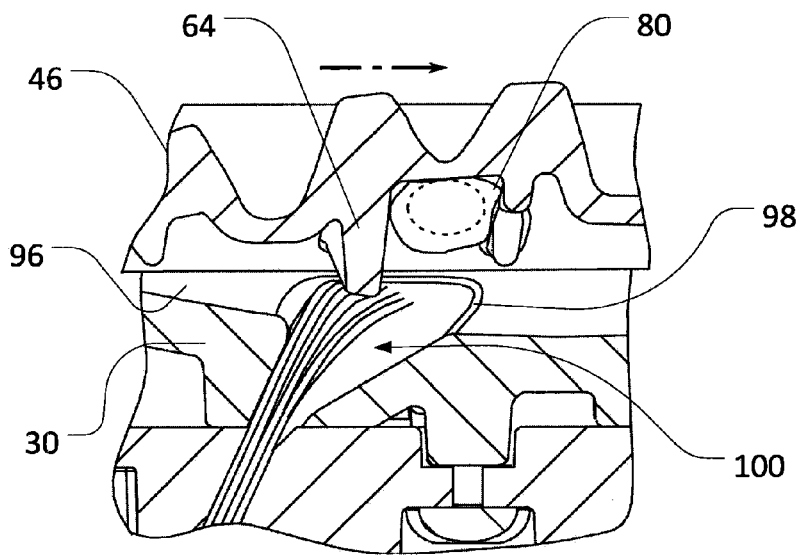
FIG. 14B is a sectional view of the seed-double eliminator of FIG. 14A, taken along plane B-B of FIG. 14A.

As noted above, various pockets 90 (i.e., various pocket openings 98 and pocket cavities 100) may be configured to receive brushes 92 (in whole or in part) when brushes 92 are deflected by paddles 64 (or other features of seed meter 24). Also as noted above, pockets 90 may additionally (or alternatively) be configured with regard to other considerations. In certain embodiments, for example, pocket openings 98 and pocket cavities 100 may be configured depending on nominal or average diameter (or other dimensions or characteristics) of a particular type of seed 80, so that seed 80 may tend not to become lodged within pockets 90 when dislodged from seed path 82. In this way, even if seed 80 falls into one of pockets 90 after being dislodged from seed path 82, seed 80 may tend to be freely released from pocket 90 for return to seed pool 60. Referring also to FIGS. 13 and 14, for example, pockets 90 may include pocket openings 98 that are larger than a nominal seed diameter (or otherwise configured dependent upon the diameter or other characteristics of seed 80). For example, referring specifically to FIG. 13, pocket opening 98 may exhibit a maximum width 112 that is larger than nominal seed diameter 110.

Pockets 90 may also include various other features or geometry, so that pockets 90 may tend to freely release seed 80 from pockets 90 toward seed pool 60. Pocket cavity 100, for example, may have a generally pyramidal shape with a wider end at pocket opening 98, such that seed 80 within pocket cavity 100 may tend to fall freely out of pocket opening 98. As depicted in FIGS. 13 and 14, pocket cavity 100 may have a generally square-based pyramidal shape, with sets of opposing internal sidewalls 100a and 100b generally meeting to form a pyramid "apex" near internal location 100c. In certain embodiments, brush 92 may be mounted at this relatively narrow apex location 100c. In this way, the mounting of brush 92 (e.g., at location 100c) may act in conjunction with the general geometry of pocket 90 (e.g., a generally pyramidal shape with side walls 100a and 100b) to prevent seed 80 from becoming lodged within pocket 90. Other configurations may also be possible.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s).

For example, the general orientation of the seed meter and delivery system can differ from that depicted in the figures. In particular, the figures illustrate a generally vertically oriented delivery system. However, the delivery system can instead be generally horizontal or at an arbitrary angle to the horizon. Therefore, any words of orientation, such as various forms of "up", "down", "top", "bottom," "above," and "below", used herein are for the purpose of describing particular embodiments only and are not intended to be limiting of the disclosure.

Accordingly, various embodiments and implementations other than those explicitly described are within the scope of the following claims.

What is claimed is:

1. A seed-double eliminator for a seeding machine with a metering member that is configured to move seed along a seed path, the seed-double eliminator comprising:
   a pocket with a pocket opening exposed to the seed path and a pocket cavity extending from the pocket opening away from the seed path; and
   a flexible extension extending from within the pocket cavity toward the seed path;
   wherein the flexible extension is disposed to contact at least one seed of a seed-double pair being moved along the seed path by the metering member in order to remove the at least one seed from the seed path;
   wherein the pocket opening receives at least a free end portion of the flexible extension within the pocket cavity when the flexible extension is deflected by the metering member.

2. The seed-double eliminator of claim 1, wherein the pocket is fixed relative to the seed path.

3. The seed-double eliminator of claim 1, wherein the pocket is included inside a housing of the metering member.

4. The seed-double eliminator of claim 1, wherein the pocket is located, with respect to the seed path, upstream of a seed pool of the housing and downstream a release position at which seed is released from the metering member to a seed delivery system.

5. The seed-double eliminator of claim 1, wherein the free end portion of the flexible extension is deflected into the pocket cavity by one or more seed paddles included on the metering member.

6. The seed-double eliminator of claim 1, wherein the flexible extension includes a brush.

7. The seed-double eliminator of claim 1, wherein one or more of the pocket opening and the pocket cavity are configured to freely release seed deflected into the pocket by the flexible extension.

8. The seed-double eliminator of claim 7, wherein the pocket opening is larger than an average diameter of the seed.

9. The seed-double eliminator of claim 1, wherein the metering member includes a generally bowl-shaped seed meter with a seed-carrying rim portion;
   wherein the seed path follows, at least in part, the rim portion of the seed meter; and
   wherein the flexible extension extends from the pocket radially and axially inward, with respect to the seed meter.

10. The seed-double eliminator of claim 1, further comprising:
    a second pocket with a second pocket opening exposed to the seed path and a second pocket cavity extending from the second pocket opening away from the seed path; and
    a second flexible extension extending from within the second pocket toward the seed path.

11. A planter including a seeding machine that is configured to move seed along a seed path, the planter comprising:
    a seed-double eliminator, including:
       a pocket with a pocket opening exposed to the seed path and a pocket cavity extending from the pocket opening away from the seed path; and
       a flexible extension extending from a mounted end of the flexible extension toward a portion of the seed path that is adjacent the pocket opening;
       wherein the flexible extension is disposed to contact at least one seed of a seed-double pair being moved along the seed path by the seeding machine in order to remove the at least one seed from the seed path; and
       wherein the pocket opening receives at least a free end portion of the flexible extension within the pocket cavity when the flexible extension is deflected by a metering member of the seeding machine.

12. The planter of claim 11, wherein the pocket is fixed relative to the seed path.

13. The planter of claim 11, wherein the pocket is included inside a housing of the seeding machine.

14. The planter of claim 13, wherein the pocket is located, with respect to the seed path, upstream of a seed pool of the housing and downstream of a release position at which seed is released from a metering member to a seed delivery system.

15. The planter of claim 11, wherein the free end portion of the flexible extension is deflected into the pocket cavity by one or more seed paddles included on the metering member.

16. The planter of claim 11, wherein the flexible extension includes a brush.

17. The planter of claim 11, wherein one or more of the pocket opening and the pocket cavity are configured to freely release seed deflected into the pocket by the flexible extension.

18. The planter of claim 11, wherein a metering member included in the seeding machine includes a generally bowl-shaped seed meter with a seed-carrying rim portion;
    wherein the seed path follows, at least in part, the rim portion of the seed meter; and
    wherein the flexible extension extends from the pocket radially and axially inward, with respect to the seed meter.

19. The planter of claim 11, wherein the seed double eliminator further comprises:
    a second pocket with a second pocket opening exposed to the seed path and a second pocket cavity extending from the second pocket opening away from the seed path; and
    a second flexible extension extending from within the second pocket toward the seed path.

* * * * *